Figure 1:
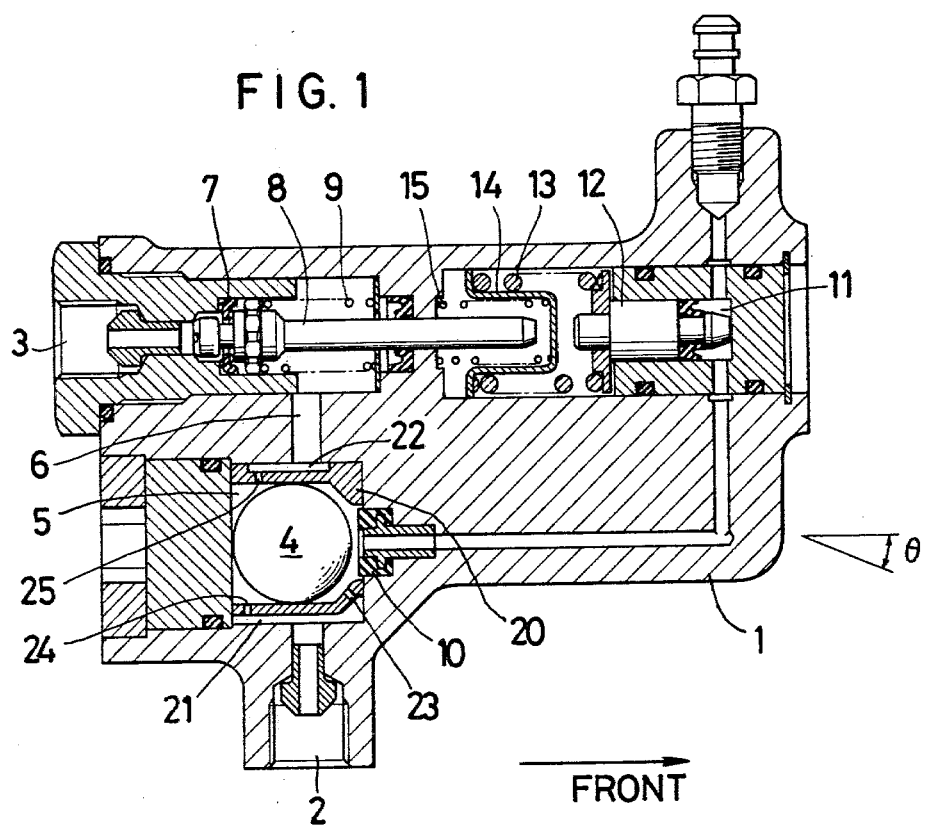

United States Patent [19]

Takata

[11] 4,253,707
[45] Mar. 3, 1981

[54] BRAKE PRESSURE CONTROL DEVICE

[75] Inventor: Koji Takata, Itami, Japan

[73] Assignee: Sumitomo Electric Industries, Ltd., Osaka, Japan

[21] Appl. No.: 50,221

[22] Filed: Jun. 20, 1979

[30] Foreign Application Priority Data

Jan. 25, 1979 [JP] Japan .................................. 54-7871

[51] Int. Cl.³ .............................................. B60T 8/14
[52] U.S. Cl. .................. 303/6 C; 303/24 A; 303/24 C; 303/24 F
[58] Field of Search ........................... 303/24, 6 C, 22; 188/195, 349

[56] References Cited

U.S. PATENT DOCUMENTS 4,133,584   1/1979   Ohta et al. ..................... 303/6 C X

FOREIGN PATENT DOCUMENTS 2736095   6/1978   Fed. Rep. of Germany ......... 303/24 F
1183199   9/1967   United Kingdom ................. 303/24 C Primary Examiner—Douglas C. Butler
Attorney, Agent, or Firm—Wenderoth, Lind & Ponack

[57] ABSTRACT

An improved deceleration-sensitive, load-responsive brake pressure control device including an inertia valve having an inertia body, a sealing chamber and a proportioning valve. The arrangement of fluid flow is such that the main flow going toward the brake exerts on the inertia body a force in the valve closing direction and the sealing flow going toward the sealing chamber exerts on the inertia body a force in the valve opening direction.

5 Claims, 2 Drawing Figures

BRAKE PRESSURE CONTROL DEVICE

The present invention relates to a brake pressure control device for vehicle braking system, and more particularly to an improved deceleration-sensitive, load-responsive brake pressure control device.

Brake pressure control or proportioning valves for reducing the pressure for rear brakes of a motor vehicle with respect to the pressure for front brakes in higher ranges of braking pressure are well known in the art.

Deceleration-sensitive brake pressure control devices are also known (e.g. from U.S. Pat. No. 3,035,870) which comprise a pressure proportioning valve and a valve (hereinafter called an inertia valve) having an inertia body adapted to shut off the passage of fluid under pressure in response to a predetermined deceleration.

Also known (e.g. from U.S. Pat. No. 3,825,303) are deceleration-sensitive, load-responsive brake pressure control devices which utilize the fluid pressure sealed by the operation of an inertia valve in response to a predetermined deceleration to control the pressure at which the pressure proportioning valve starts to operate, thereby distributing the braking pressure to front and rear brakes according to the load of the vehicle.

Also known (e.g. from U.S. Pat. Nos. 3,317,251 and 3,383,139) are deceleration-sensitive, load-responsive brake pressure control device which regulate the deceleration at which the inertia valve operates in accordance with the braking pressure, thereby controlling the distribution of braking pressure to the front and rear brakes according to the vehicle load.

These conventional deceleration-responsive pressure control devices have a disadvantage that the rate of increase in the sealed pressure on rapid operation of the braking device is too large compared to the delay from the buildup of braking pressure to the actual occurrence of deceleration. Before the inertia valve actually closes in response to the deceleration, an excessive amount of fluid has passed through the valve seat into the sealing chamber so that the pressure sealed therein can exceed considerably the predetermined pressure corresponding to the deceleration in response to which the inertia valve is intended to operate.

In order to prevent such an excessive sealed pressure upon rapid application of brake pressure, a throttle is usually provided in the fluid line leading to the inertia valve chamber or the passage between the inertia valve chamber and the sealing chamber. However, since the volume of fluid required to expand the sealing chamber, as governed by the flow rate through such a throttle, is relatively small, particularly under light load conditions, the effect of the throttle is not sufficient to keep the sealed pressure below the predetermined level.

Excessive sealing upon rapid brake operation occurs mainly under light-load conditions where since the predetermined sealed pressure is low and the displacement of the piston operated by the sealed pressure is small, the flow rate in the branch circuit is low and thus the throttling effect is small.

Under heavy-load conditions, because the designed sealed pressure is high, the sealed pressure will seldom become excessive. But, because of high sealed pressure, the displacement of the piston is large and thus the flow rate in the branch circuit is high. Therefore, the throttling effect is rather excessive if the throttle is adjusted to cope with the light load conditions.

If the braking system for the front wheels fails, the fluid pressure for obtaining a given deceleration is extremely high because only the rear brake is used. In this case, the sealed pressure is liable to be insufficient rather than excessive.

In short, the use of a throttle in the sealing circuit does not achieve the desired result adequately because its effect is insufficient under light-load conditions where excessive sealing often occurs but is sufficient or even excessive under heavy-load conditions where excessive sealing seldom occurs.

An object of the present invention is to provide a deceleration-sensitive, load-responsive brake pressure control device which obviates such shortcomings.

According to this invention, unlike the conventional control device in which an inertia body is arranged in the fluid flow path leading only to the sealing chamber (hereinafter called the sealing flow), the inertia body is adapted to be subjected not only to the sealing fluid flow but also to the main flow going directly to the rear brake, thereby moving the inertia body in the valve-closing direction by means of the swift current in the main flow necessarily caused by rapid pressure buildup upon rapid operation of brake to hasten the timing of closing of the inertia valve so as to prevent excessive sealed pressure. In addition, the arrangement is such that when the fluid pressure and thus the flow rate into the sealing chamber is high, the flow toward the sealing chamber will give the inertia body a driving force in a reverse direction to that which it is given by the main flow, thereby also preventing sealing before the sealed pressure is sufficient.

In other words, two kinds of forces act on the inertia body in the valve closing direction; the first one is the inertia force caused by deceleration and the second one is the force caused by the main fluid flow. The second one is independent of the vehicle load but instead is dependent on the rate of pressure increase. In addition, a third force caused by the sealing flow toward the sealing chamber acts on the inertia body in the reverse direction or the valve opening direction. This third force is dependent on both the vehicle load and the rate of pressure increase.

By this arrangement, under light-load conditions the closing of the inertia valve is hastened to prevent sealing at excess pressure and under heavy-load conditions and upon failure of the front brake circuit the valve closing forces are counteracted to prevent sealing before the sealed pressure is sufficient.

As the forces by which fluid moves an inertia body are available as a force pushing it in a transverse direction, a force causing it to turn, a force attracting it, etc., a force caused by the main flow in the valve closing direction can be easily obtained by using one of them or a combination thereof, whereas the driving force caused by the sealing flow toward the sealing chamber is not so easily obtainable with a single inlet for the inertia body chamber.

According to the present invention, a plurality of inlets are provided for the inertia valve chamber and are arranged so that the fluid flow through some of these inlets will flow through the valve seat into the sealing chamber whereas the fluid flow through the rest of the inlets will flow through the outlet of the chamber (of which there may be two or more) toward the rear brake. This makes it relatively easy to drive the inertia body in the valve opening direction by means of the sealing flow and drive it in the valve closing direction by means of the main flow.

If the force in the valve closing direction is too large compared with the force in the valve opening direction, a bypass line may be provided so that only a part of the fluid flow flowing to the rear brakes will pass through the inertia body chamber, the rest of it bypassing said chamber.

This can be easily carried out by providing a hole in the housing of the control device with a larger diameter than that of the inertia body and pressing into the hole a cage for guiding the inertia body, said cage having inlet and outlet passages in the wall thereof and with grooves in the outer periphery thereof connecting some of said inlets with outlets. The housing itself has only to be provided with one inlet passage and one outlet passage so as to communicate with the grooves formed in the cage.

Figure 2:
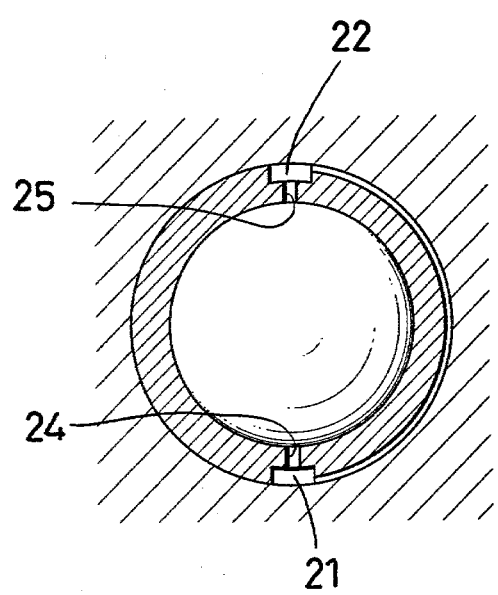

Other objects and features of the present invention will become apparent from the following description taken with reference to the accompanying drawing in which:

FIG. 1 is a vertical sectional view of an embodiment of the present invention; and FIG. 2 is a transverse section through the inertia valve of FIG. 1.

The brake pressure control device according to this invention has a housing 1 with an inlet 2 leading from a source of braking pressure and an outlet 3 leading to the rear brakes. The inlet 2 communicates with an inertia body chamber 5 which in turn communicates with a chamber of a proportioning valve through a passage 6. An inertia body 4 in the chamber 5 engages a valve seat 10 so as to act as an inertia valve. The proportioning valve comprises a valve seal 7 and a plunger 8 and receives fluid under pressure through the passage 6 and supplies it through the outlet 3 to the rear brakes after reducing the pressure thereof to a suitable level. A first spring 9 urges the plunger 8 leftwardly or in the valve-opening direction.

The whole control device is mounted at an angle of $\theta$ relative to the vehicle and thus the inertia body 4 is on a slope having such a gradient. When the rate of deceleration caused by braking exceeds a predetermined value, the inertia body 4 rolls up the slope to the right in the figure by the action of inertia force, seating against the valve seat 10 to cut off the communication between the inertia valve chamber 5 and a sealing chamber 11. By the fluid pressure present in chamber 11 at the time of sealing, a piston 12 is pushed to the left. The thrust of the piston is transmitted to the plunger 8 through a third spring 13 and a plate 14 also biassed to the right by a second spring 15. Thus, the force transmitted to the plunger 8 is the thrust of the piston 12 minus the force of the second spring 15.

The reduction starting pressure or the so-called cut-in pressure of the proportioning valve is proportional to the force urging the plunger 8 in the valve-opening direction, which is the sealed pressure multiplied by the effective sectional area of the piston 12 plus the force of the first spring 9 minus the force of the second spring 15.

A conventional deceleration-sensitive, load-responsive brake pressure control device also has the foregoing structure.

Next, the subject matter which distinguishes the present invention will be described in more detail.

A cage 20 is pressed into the inertia body chamber 5, said cage having an inlet groove 21 in the peripheral surface thereof communicating with the inlet 2 and an outlet groove 22 in the peripheral surface thereof communicating with the passage 6, that is, the outlet of the chamber 5. These grooves are formed to extend parallel to the axis of the cage. The cage also has a sealing flow inlet 23 disposed at its front bottom portion and a main flow inlet 24 disposed at the rear bottom portion, both of them communicating with the inlet groove 21. The fluid passing through the sealing flow inlet 23 makes its way mainly to the sealing chamber 11 whereas the fluid passing through the main flow inlet 24 flows mainly toward the passage 6 through a main flow outlet 25 formed in the cage to communicate with the outlet groove 22. This occurs because the inertia body chamber 5 formed in the cage 20 is separated substantially into two chambers by the inertia body 4 rollably mounted in the cage with a small clearance. A circumferential bypass groove 26 may also be provided in the outer periphery of the cage 20 to connect the inlet groove 21 directly with the outlet groove 22 so that part of the fluid will bypass the inertia valve chamber.

When the rate of increase in the braking pressure is relatively low, the inertia body 4 engages the valve seat 10 upon the occurrence of a predetermined deceleration, sealing the fluid pressure then in the sealing chamber 11. Before that time, however, due to the pressure increase, the piston 12 moves to the left while compressing the second spring 15 and the third spring 13. Accordingly, the volume of the sealing chamber increases and an amount of fluid corresponding to the increase will flow into the sealing chamber mainly through the sealing flow inlet 23 and the valve seat 10 before the valve is closed.

At the time of rapid application of the brakes, i.e. when the rate of pressure increase is high, the pressure in the whole system including the sealing chamber 11 will become excessive before the predetermined deceleration occurs. In relatively light-load conditions in which sealing of excess pressure in the chamber 11 must be avoided, therefore, the inertia body 4 needs to be moved to engage and close the valve seat 10 before the occurrence of the predetermined deceleration.

At the time of such a rapid braking, the rate of the main fluid flow passing through the inlet groove 21 and the main flow inlet 24, past the inertia body 4 and through the main flow outlet 25 and the outlet groove 22 becomes higher. Thus, the fluid flow past the inertia body 4 applies to it some thrust and turning moment, which, coupled with the inertia force produced by deceleration, causes the inertia body to roll toward the valve seat 10 up the gradient $\theta$. In order to make the force neither too large nor too small, the number, position, diameter and angle of the main flow inlet 24 and the main flow outlet 25, the ratio of the cross sectional area of the bypass groove 26 to that of the main flow inlet 24, the clearance between the inertia body 4 and the cage wall, etc. should be carefully determined. These are also related to the weight of the inertia body, the distance which the inertia body moves to engage the valve seat, the amount of fluid necessary for the actuation of the rear brakes, the time delay in the actual operation and nonlinear behavior of the front and rear brakes, and even the rigidity of the suspensions for the front and rear wheels. They should, therefore, be readjusted by experiments after the specifications of the vehicle and of the front and rear brakes have been decided on.

In heavy-load conditions or upon failure of the front brake system when insufficient rather than excessive sealed pressure must be avoided, the effect of the main flow in hastening the operation of the inertia valve has to be counteracted. The sealing flow inlet 23 serves this purpose. Since the sealing chamber and the inertia body chamber are at the same pressure until the valve seat 10 has been closed, the piston 12 moves leftwardly as the pressure in the whole system increases. This produces a fluid flow going mainly through the sealing flow inlet 23 and the valve seat 10. This fluid flow gives the inertia body 4 some amount of thrust and turning moment in a direction opposite to the thrust and turning moment caused by the main flow through the main flow inlet 24, thus reducing the force due to the main flow flowing through the main flow inlet 24 and main flow outlet 25. The larger the vehicle load the later the sensing of deceleration will occur and thus the larger the counteracting force due to the flow through the sealing flow inlet 23 and the later the closing of the inertia valve.

In other words, the force hastening the actuation of the inertia valve is approximately inversely proportional to the vehicle load for a given rate of pressure increase.

To ensure this effect, the number, position, diameter and angle of the sealing flow inlet 23 should also be determined suitably, of course.

It will be understood from the foregoing that the control device according to this invention retains some degree of load responsiveness even at a time of rapid brake pressure application, where as a conventional control device of this type will lose load responsiveness. This means that an inertia-controlled valve or a deceleration-sensitive, load-responsive control device can be employed in a wider field of application than before. (Theoretically, there still exists an ultra-rapid braking range in which even the control device according to this invention loses its load responsiveness. However, the frequency with which such an extremely rapid braking actually occurs is much smaller than that with which rapid braking covered by this invention occurs. Thus, this invention has a large practical value.)

Furthermore, the device of the present invention can be constructed at a reasonable cost because the structure of the inertia body chamber can be easily made simply by pressing into a hole in the body of the control device a cage 20 having axial inlet and outlet grooves 21 and 22 and radial inlets 23 and 24 and outlet holes or passages 25.

Although the disclosed embodiment of the present invention is a deceleration-sensitive, load-responsive control device of the type in which the sealed pressure is amplified by a piston and a plurality of springs, it is to be understood that the present invention is applicable to other types of control devices, including one employing a delay valve in place of the second spring in the present embodiment and a so-called variable-deceleration type in which the gradient of the guide surface for the inertia body varies according to the pressure and in which the pressure amplifying mechanism is omitted.

Although this invention has been described with respect to the preferred embodiment, it is to be understood that many changes or variations may be made within the spirit and scope of the present invention.

What I claim:

1. A deceleration-sensitive, load-responsive brake pressure control device for a vehicle, comprising:
   a brake pressure control valve;
   a sealing chamber and means controlled by the pressure in said sealing chamber for actuating said control valve in response to the pressure in said sealing chamber;
   an inertia body chamber having a sealing flow outlet communicating with said sealing chamber;
   an inertia body movable in said inertia body chamber in response to the deceleration of the vehicle for acting as a valve member for closing said sealing flow outlet for sealing fluid pressure then in said sealing chamber, said inertia body chamber for dividing the inertia body chamber into substantially two parts;
   a sealing flow inlet opening into the portion of said inertia body chamber from which said sealing flow outlet opens;
   a main flow inlet opening into the portion of said inertia body chamber on the opposite side of said inertia body from the portion from which said sealing outlet opens; and
   a main flow outlet opening out of said portion of said inertia body chamber into which said main flow inlet opens and extending to said control valve.

2. A device as claimed in claim 1 further comprising a cage in said inertia body chamber in which said inertia body is mounted for movement, said cage having said sealing flow and main flow inlets and said main flow outlet therein, and said cage further having an inlet flow groove in the outer periphery thereof parallel to the axis thereof for connecting said sealing flow inlet and said main flow inlet, and means for supplying pressure fluid to said groove.

3. A device as claimed in claim 2 in which said cage further has a bypass groove extending around the outer periphery thereof for connecting said inlet flow groove and said main flow outlet.

4. A device as claimed in claim 1 in which said inertia body chamber is inclined upwardly in the direction toward said sealing flow outlet, and said main flow outlet is disposed at the rear bottom of said inertia body chamber and said sealing flow inlet is disposed at the front bottom of said inertia body chamber, and said main flow outlet is at the rear top of said inertia body chamber.

5. A device as claimed in claim 1 further comprising a single housing in which said brake pressure control valve, said sealing chamber and means associated therewith, said inertia body chamber and inertia body are contained.

* * * * *